Oct. 25, 1932.  W. C. ROBBINS  1,884,251
LINKAGE CONNECTION
Filed Nov. 5, 1930
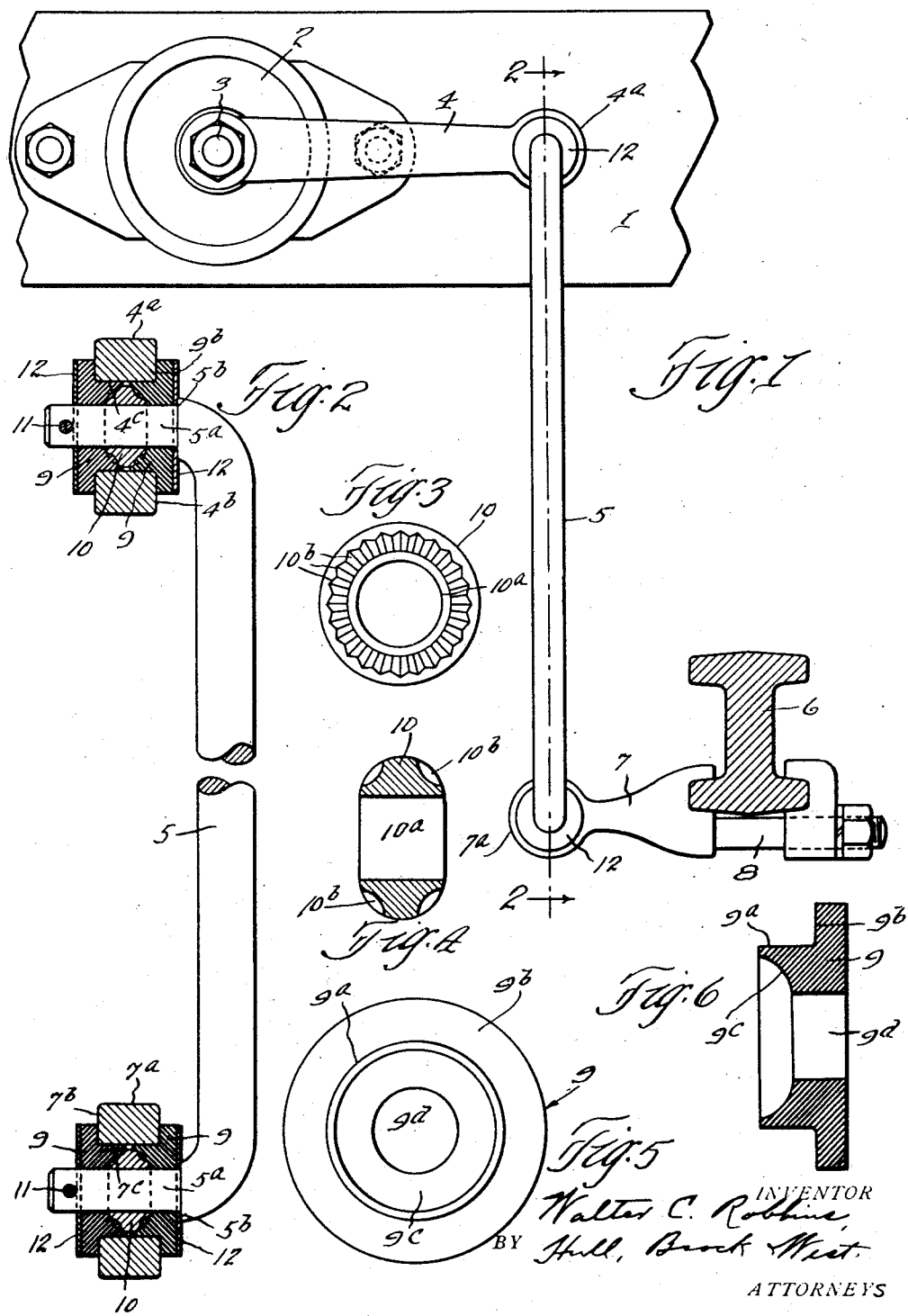

Patented Oct. 25, 1932

1,884,251

UNITED STATES PATENT OFFICE

WALTER C. ROBBINS, OF CLEVELAND, OHIO, ASSIGNOR TO THE GABRIEL COMPANY, OF CLEVELAND, OHIO, A CORPORATION OF OHIO

LINKAGE CONNECTION

Application filed November 5, 1930. Serial No. 493,575.

This invention relates to linkage connections and, in the embodiment shown herein, is particularly adapted for use in connecting the operating arms for hydraulic shock absorbers to the axles of the vehicles with which they are employed.

It is the general purpose and object of the invention to provide a linkage assembly of this character which is economical of production, which is capable of withstanding indefinitely the incidents of use, and which can be operated without the necessity for lubricant.

Further and more limited objects of the invention will appear hereinafter and will be realized in the construction and arrangement of parts shown in the drawing, wherein Fig. 1 represents a sectional elevation of the side frame and axle of a vehicle showing the manner in which my invention is applied to a shock absorber associated therewith; Fig. 2, a detail in section corresponding to the line 2—2 of Fig. 1, the connecting rod being shown in elevation; Fig. 3, a side elevation of, and Fig. 4, a detail in section through, the metal insert forming part of the connection between each end of the connecting rod and the parts with which they are respectively associated; Fig. 5 a side elevation of one of the deformable bushing members; and Fig. 6 a sectional view through such member.

Describing the various parts by reference characters, 1 denotes one of the side members of an automobile having a shock absorber 2 attached thereto, the shock absorber illustrated being of the rotary piston type and provided with a shaft 3 to which is connected an arm 4. This arm 4 is connected by a rod 5 with an axle 6 through the arm 7 of a clamp indicated generally at 8 and secured to such axle.

My invention resides more particularly in the connections between the ends of the rod 5 and the eye portions $4^a$ and $7^a$ respectively on the ends of the arms 4 and 7. As will appear more particularly from Fig. 2, the eye portions $4^a$ and $7^a$ are provided with opposed parallel sides $4^b$ and $7^b$, respectively, and the interior of each such eye portion is a cylindrical surface, as shown at $4^c$ and $7^c$, respectively.

Each end of the rod 5 is provided with a reduced cylindrical extension $5^a$, with a shoulder $5^b$ formed between such extension and the body of the rod. Each of these extensions constitutes in effect a trunnion, and these trunnions are mounted within their respective eye portions $4^a$ and $7^a$ in the following manner:—

9 denotes a bushing member of deformable material, such as soft rubber there being four such members. Each of these members is preferably circular in outline and each is provided with an outer cylindrical surface $9^a$ from the outer end of which there extends a vertical annular surface $9^b$. The surfaces $9^a$ are adapted to engage, respectively, one side of the inner surface $4^c$, $7^c$ of the eye portions carried by the arms 4 and 7, respectively, while the other surfaces ($9^b$) are adapted to engage the opposite sides of said eye portions. Two such bushings are employed, the bushings being symmetrical and being mounted so that the spherical concavities $9^c$ thereof are pressed toward each other, each bushing having a central opening $9^d$ therethrough for a trunnion $5^a$.

10 denotes a metal insert for each bushing, said insert having a central opening $10^a$ adapted to receive a trunnion $5^a$. Each insert is generally elliptical in sections taken through and including the axis thereof and is provided on its opposite sides with annular series of serrations $10^b$ which, when the opposed bushing members are forced toward each other, enter into gripping engagement with such members, as will appear clearly from Fig. 2, with the outer surface of each insert substantially enclosed by its bushing. In order to secure the bushing members in such compressed condition, the cotter pins 11 are inserted through the outer ends of the trunnions after the bushing members shall have been compressed, and the exterior face of each bushing member is provided with a washer 12. For each metal insert it is preferable to use a zinc alloy casting which serves to take the load transmitted to the arms 4 and 7 through the trunnions $5^a$, while preventing any seizure between the said insert and the trunnion which extends therethrough.

The deformable bushing members enable the trunnions 5ᵃ to rotate therewithin without the necessity for employing lubricant, and the composite mounting consisting of the bushing members and the insert also accommodates lateral movements between the arms 4 and 7 due to relative movements of the vehicle body laterally with respect to the axle thereof. Furthermore, the load is transmitted to and from the eye portions 4ᵃ and 7ᵃ through a small cross-sectional area of the deformable bushings which substantially enclose the metal inserts. This provision of an envelope of deformable material of such small cross sectional area between the inserts and the eye portions prolongs the life of the bushings, as deformable material possessing a large cross sectional area at the place indicated is liable to be pounded out and deformed under the incidents of use.

By virtue of the construction and arrangement of parts shown herein, it will be evident that I have produced a link connection or assembly which is simple in construction and economical of production and which is capable of withstanding for a long period all of the ordinary incidents of use.

Having thus described my invention, what I claim is:

1. In a link assembly, the combination, with an arm having an eye portion and a rod having a trunnion adapted to be inserted in said eye portion of means for connecting said trunnion and eye portion, said means comprising a pair of opposed bushing members each having a bore therethrough by which it may be mounted on said trunnion and each having a concave surface extending radially outwardly from such bore, the concave surfaces of the said bushing members being presented toward each other and each of said bushing members also having surfaces adapted to engage a side and a portion of the inner surface of such eye portion, a reinforcing insert on said trunnion interposed between the bushing members, the said insert having sides shaped to cooperate with the adjacent concave faces of the bushing members, and means for securing the bushing members upon the trunnion under compression exerted in the direction of the axes of said bushing members whereby the said members are presed against the eye portion and into engagement with the exterior of the insert.

2. In a link assembly, the combination with an arm having an eye portion and a rod having a trunnion adapted to be inserted in said eye portion, of means for connecting said trunnion and eye portion, said means comprising a pair of opposed bushing members each having a bore therethrough by which it may be mounted on said trunnion and each having a concave surface extending radially outwardly from such bore, the concave surfaces of the said bushing members being presented toward each other, each of said bushing members also having surfaces adapted to engage the side and a portion of the inner surface of such eye portion, a reinforcing insert on said trunnion interposed between the bushing members, the said insert having sides shaped to cooperate with the adjacent concave faces of the bushing members and each such side being provided with recesses, and means for securing the bushing members upon the trunnion under compression exerted in the direction of the axes of such bushing members whereby the members are pressed against the eye portion and against and into the recesses of the insert.

3. In a link assembly, the combination, with an arm having an eye portion provided with substantially parallel sides and a cylindrical inner surface and a rod having a trunnion adapted to be inserted in said eye portion, of means for connecting said trunnion and eye portion, said means comprising a pair of opposed bushing members of deformable material each having a bore therethrough for the reception of a trunnion and each provided with a concave surface extending radially outwardly from such bore, the concave surfaces of the bushing members being presented toward each other and each bushing member also having an annular radial seating portion adapted to engage a side of the eye portion and a cylindrical portion adapted to engage the interior portion of such eye portion, and a reinforcing insert on said trunnion, the said insert having outwardly convex sides each provided with an annular series of recesses, and means for securing the bushing member upon the trunnion under compression in the direction of the axis of said trunnion thereby to force portions of the concave surfaces of the bushing member into the recesses on the insert.

4. In a link asembly, the combination with an arm having an eye portion and a rod having a trunnion adapted to be inserted in said eye portion, of means for connecting said trunnion and eye portion, said means comprising a pair of opposed bushing members of deformable material each having a bore therethrough for the reception of a trunnion and each provided with a concave surface extending radially outwardly from such bore, the concave surfaces of the bushing members being presented toward each other and each bushing member also having a surface adapted to engage a side of the eye portion, and a portion adapted to engage the interior portion of such eye portion, and a reinforcing insert on said trunnion, the said insert having outwardly convex sides each provided with an annular series of recesses, and means for securing the bushing members upon the trunnion under compression in the direction of the axis of said trunnion thereby to force portions of the concave surfaces of the bushing members into the recesses on the insert.

5. In a link assembly, the combination, with an arm having an eye portion and a rod having a trunnion adapted to be inserted in said eye portion, of means for connecting said trunnion and eye portion, said means comprising a pair of opposed bushing members of deformable material each mounted on said trunnion and adapted to engage the side and a portion of the interior of the eye portion, a reinforcing insert mounted on said trunnion between the said bushing members and extending radially outwardly from said trunnion and overlapped by the portions of said bushing members within the said eye portion, and means for securing the bushing members and the insert upon the trunnion under compression exerted in a direction longitudinal of the axis of said trunnion, the said bushing members interposing a wall of limited cross-sectional area between the peripheral portion of said insert and the interior of said eye portion.

In testimony whereof, I hereunto affix my signature.

WALTER C. ROBBINS.